United States Patent
Simoncelli et al.

(10) Patent No.: US 9,959,177 B2
(45) Date of Patent: May 1, 2018

(54) BACKING UP VIRTUAL MACHINES

(71) Applicant: Red Hat Israel, Ltd., Raanana (IL)

(72) Inventors: Federico Simoncelli, Fano (IT); Liron Aravot, Ramat Gan (IL)

(73) Assignee: Red Hat Israel, Ltd., Raanana (IL)

(*) Notice: Subject to any disclaimer, the term of this patent is extended or adjusted under 35 U.S.C. 154(b) by 167 days.

(21) Appl. No.: 14/191,897

(22) Filed: Feb. 27, 2014

(65) Prior Publication Data

US 2015/0242283 A1 Aug. 27, 2015

(51) Int. Cl.
*G06F 11/14* (2006.01)

(52) U.S. Cl.
CPC ...... *G06F 11/1466* (2013.01); *G06F 11/1456* (2013.01); *G06F 2201/815* (2013.01)

(58) Field of Classification Search
CPC ............. G06F 11/1435; G06F 11/1456; G06F 2201/815; G06F 11/1466
See application file for complete search history.

(56) References Cited

U.S. PATENT DOCUMENTS

| | | | |
|---|---|---|---|
| 6,341,341 B1* | 1/2002 | Grummon | G06F 3/0617 711/162 |
| 7,529,897 B1* | 5/2009 | Waldspurger | G06F 11/1438 711/161 |
| 8,566,542 B1* | 10/2013 | Wang | G06F 11/1456 711/114 |
| 2003/0182322 A1* | 9/2003 | Manley | G06F 17/30212 |
| 2010/0011178 A1* | 1/2010 | Feathergill | G06F 11/1466 711/162 |
| 2014/0365740 A1* | 12/2014 | Vasilyev | G06F 11/1451 711/162 |

* cited by examiner

*Primary Examiner* — David X Yi
*Assistant Examiner* — Zubair Ahmed
(74) *Attorney, Agent, or Firm* — Lowenstein Sandler LLP

(57) ABSTRACT

A processing device generates a live snapshot of a virtual disk image attached to a virtual machine, wherein generating the live snapshot comprises converting an existing read-write volume to a read-only volume. The processing device generates, from the read-only volume, a temporary snapshot of the virtual disk image, the temporary snapshot comprising a temporary read-write volume. The processing device attaches the temporary snapshot of the virtual disk image to a backup component and causes at least one of the backup component or a backup service to backup the virtual disk image from the attached temporary snapshot.

15 Claims, 6 Drawing Sheets

BACKING UP VIRTUAL MACHINES

TECHNICAL FIELD

Embodiments of the present invention relate to virtual machines, and more specifically to backing up virtual machines.

BACKGROUND

Many backup services are unable to backup disks attached to running virtual machines, or to backup the state of live virtual machines.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for backing up virtual disk images attached to virtual machines. Traditionally backup systems have difficulty generating successful backups of active virtual disk images that are attached to live virtual machines. Backup systems may also have difficulty backing up a state of a running virtual machine. Embodiments described herein provide a virtual machine management system that facilitates the backup and restore of virtual disk images and of the states of running virtual machines.

In some embodiments a backup manager and/or backup module prepares an active (in-use) virtual disk image for backup by generating a live snapshot of the virtual disk image while the virtual disk image is attached to a virtual machine. The backup manager or backup module subsequently creates a temporary snapshot of a read-only volume created by the live snapshot operation. The temporary snapshot is then attached to a virtual backup appliance or to a backup application running on a host. A backup service is then able to perform a backup of the temporary snapshot.

As part of the backup process the backup service may write to the temporary snapshot. This written data is inconsequential to the virtual disk image that is being backed up. Once the backup of the virtual disk image as represented by the temporary snapshot is complete, the temporary snapshot (including any new data written to the temporary snapshot by the backup service) is detached from the virtual backup appliance or backup application and then deleted. Thus, the temporary snapshot enables backup of the read-only volume to be performed even by backup services that write to the virtual disk image as part of the backup operation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Figure 1:
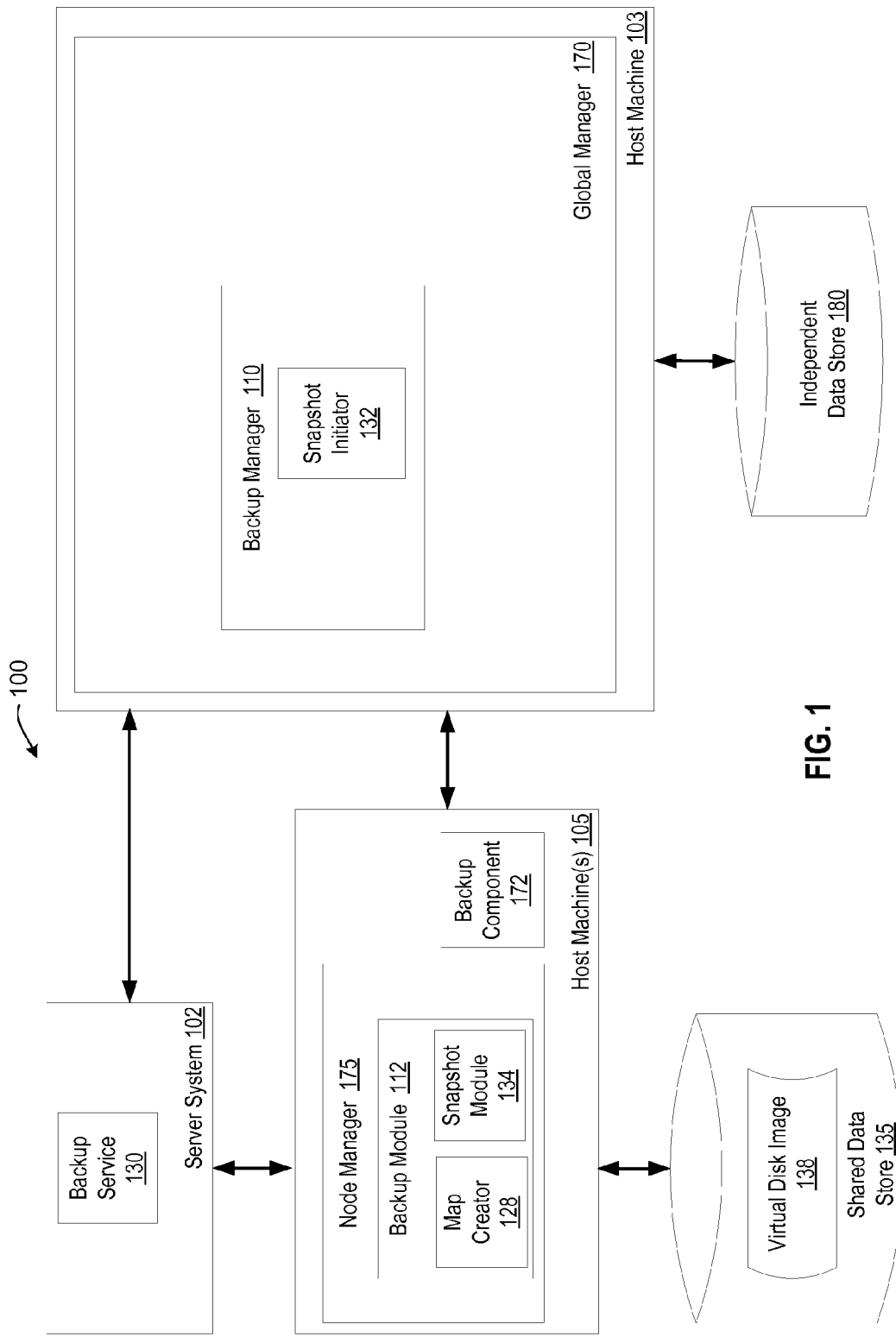
FIG. 1 is a block diagram of a network architecture for a virtual machine management system, in accordance with one implementation.

FIG. 1 is a block diagram of a network architecture of a virtual machine management system 100. Machines in the virtual machine management system 100 may be connected via a network (not shown). The network may include a private network (e.g., a local area network (LAN), wide area network (WAN), intranet, etc.) and/or a public network (e.g., the Internet). The virtual machine management system 100 may include one or more host machines 103, 104, one or more data stores, 135, 180 and/or a server system 102 that includes a backup service. Alternatively, the server system 102 may be external to the virtual machine management system 100, and may communicate with the host machines 103, 105 via the network or another network.

The host machines 103, 105 may be computer systems that run and/or manage virtual machines. One example host machine is illustrated and discussed in greater detail with reference to FIG. 2. Host machines may have independent data stores (e.g., independent data store 180) and/or may have access to a shared data store (e.g., shared data store 135). Data stores may include internal or external disk drives, solid state drives (SSDs) and/or other persistent storage devices that are connected to individual host machines or a network. Some or all of the host machines 103, 105 may be arranged into one or more clusters. A shared data store 135 may be a network attached storage (NAS), storage area network (SAN), cloud storage, or other shared storage that is accessible to multiple host machines in a cluster.

Host machine 103 includes a global manager 170. The global manager 170 may be a virtualization management application that manages hardware nodes (host machines 105), storage and network resources. The global manager 170 deploys and monitors virtual machines (VMs) running in a data center. The global manager 170 may provide a user interface that enables an administrator to view and manage all aspects of a data center. Additionally, the global manager 170 may perform such actions as migrating virtual machines between host machines, configuring new host machines to act as nodes in the virtual management system 100, managing loads and resource utilization on host machines and virtual machines, managing resource quotas (e.g., storage quotas), facilitating backup of VMs, and so on.

The VM management system 100 may include multiple host machines 105, which may be arranged in one or more clusters. Each host machine 105 may include a node manager 175 that manages a hypervisor (not shown) running on the host machine 105 and that further interfaces with the global manager 170. The node manager 175 may load new virtual machines onto the hypervisor, perform or initiate backup operations for virtual disk images and/or for the state of virtual machines, coordinate with other node managers to migrate VMs, and perform other operations with respect to the virtual machines and the hypervisor running on a same host machine as the node manager 175.

In one embodiment, global manager 170 includes a backup manager 110. Backup service 130 running on a server system 102 (that may be internal or external to the virtual machine management system 100) may coordinate with backup manager 110 to backup virtual disk images (e.g., virtual disk image 138). Examples of backup services include IBM® Tivoli® Storage Manager, Symantec® Backup Exec, EMU® RecoverPoint, and so on.

In one embodiment, backup manager 110 includes an application programming interface (API) that the backup service 130 or another application can access to perform live snapshots, to attach and/or detach snapshots, and/or to perform other operations associated with backing up a virtual disk image. To initiate a backup of a virtual disk image (and possibly the state of a virtual machine), the backup service 130 may use the API to designate a particular virtual machine and/or virtual disk image using one or more of a storage pool identifier that identifies a storage pool in which the virtual disk image is located, a storage domain identifier that identifies a storage domain within the storage pool, an image identifier that identifies the virtual disk image, a volume identifier that identifies which version of the virtual disk image is to be backed up, a media access control (MAC) address of the virtual machine, a port associated with the virtual machine, a virtual local area network (VLAN) address used by the virtual machine, and so on. The backup service may also request to backup, for example, all virtual disk images that are stored in a particular storage pool or storage domain. The backup service may also request to backup all volumes of a particular virtual disk image. Embodiments are described herein with reference to backup of a single virtual disk image or virtual machine, and in particular to a particular volume of a single virtual disk image. However, the described embodiments may also apply to backup of multiple virtual disk images and/or multiple volumes of virtual disk images.

Some or all of the host machines 105 may include a backup component 172, which may be a host backup application that runs on the host machine or a virtual backup appliance that runs inside of a virtual machine hosted by the host machine 105. The backup component 172 may be responsible for attaching or mounting a virtual disk image that is to be backed up, as well as performing or initiating backup operations.

The node manager 175 running on each host machine 105 may additionally include a backup module 112 that performs one or more operations to facilitate a backup operation based on instructions received from the backup manager 110.

Responsive to a request from backup service 130 or another requestor to backup a particular virtual disk image or virtual machine, backup manager 110 may perform a sequence of operations to prepare that virtual disk image or virtual machine for backup. Backup manager 110 may additionally perform such operations to prepare a virtual disk image or virtual machine for backup without first receiving any request from the backup service 130 or other requestor. In either instance, backup manager 110 may instruct or notify the backup service 130 to perform backup of the prepared virtual machine after that virtual machine has been prepared.

In one embodiment, to prepare a running virtual machine and/or a virtual disk image attached to the running virtual machine for backup, a snapshot initiator 132 of the backup manager 110 causes a snapshot to be taken of the virtual disk image. This may include directing a snapshot module 134 of the backup module 112 to generate a live snapshot of the virtual disk image. Generating the live snapshot may include creating a new empty read-write volume of the virtual disk image, flushing all data from a cache of the virtual machine to a current volume of the virtual disk image, transitioning the current volume from a read-write state to a read-only state, and then making the new volume active. Thereafter, any new writes are made to the new volume, and not to the volume that was transitioned to a read-only state. Snapshot module 134 may additionally save a virtual machine configuration of the virtual machine and/or a disk configuration of the virtual disk image to capture the state of the virtual machine.

After the live snapshot is complete, snapshot module 134 generates a temporary snapshot of the read-only volume that represents the state of the virtual disk image at the time that the backup was requested. In one embodiment, snapshot module 134 generates the temporary snapshot responsive to a request from the backup manager 110 to attach the read-only volume to the backup component 172. Temporary snapshots are discussed in greater detail below with reference to FIG. 3.

Backup module 112 attaches the temporary snapshot to the backup component 172, which may run on a host operating system of the host machine 105 or within a virtual machine. Once the temporary snapshot is successfully attached to the backup component 172, backup module 112 or backup manager 110 may notify the backup service 130 that the virtual machine is ready for backup. Alternatively, the backup component 172 may notify the backup service 130 that the virtual disk image is ready for backup. The backup service 130 may then perform backup of the virtual disk image from the temporary snapshot that has been attached to the backup component 172. Alternatively, the backup component 172 may perform the backup operations, or a portion of the backup operations. In one embodiment, the backup component coordinates with the backup service 130 to perform the backup.

Once the backup is complete, the backup module 112 may detach the temporary snapshot from the backup component 172. In one embodiment, the backup component 172 or node manager 175 notifies the backup manager 110 when the backup is complete. Responsive to this notice, the backup manager 110 may instruct the backup component 172 or node manager 175 to detach the temporary snapshot. Once the temporary snapshot is deleted, node manager 175 may delete the temporary snapshot.

If the backup component 172 is a host based backup component (e.g., a host backup application running on an operating system of the host machine 105), the backup component 172 may not have an ability to directly load a multi-volume virtual disk image (e.g., a snapshot of a virtual machine). In such an instance, backup module 112 may include a map creator 128. The map creator 128 may create a virtual block device that provides a single volume representation of a multi-volume virtual disk image (e.g., a disk image for which one or more snapshots have been generated). This may include generating a map of the state of the virtual disk image from the temporary snapshot. The map identifies, for each offset of the virtual disk image, which volume contains most recent data for that offset. For example, the map may identify that most recent data for a first 64 kB block (e.g., a block containing offsets at 0-63 kB) is contained in a base volume, and that the most recent data for a second 64 kB block is contained in a second read-only volume that points to the base volume. The virtual block device enables the entire virtual disk image as represented by the multiple volumes to be read by the host backup application.

Figure 2:
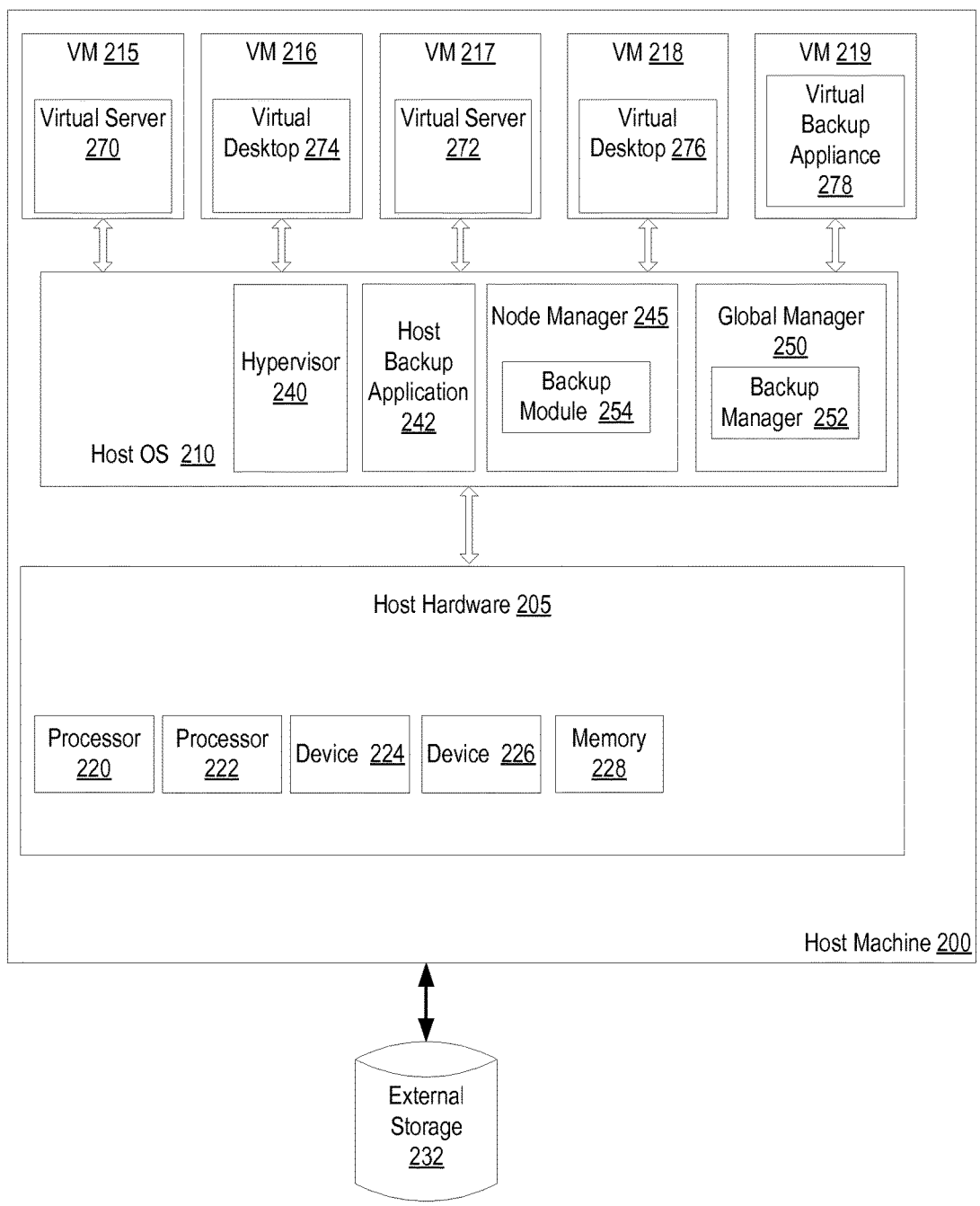
FIG. 2 is a block diagram that illustrates an embodiment of a computer system that hosts one or more virtual machines and virtual appliances.

FIG. 2 is a block diagram that illustrates an embodiment of a computer system (referred to herein as a host machine 200) that hosts one or more virtual machines (VMs) 215-

219. The host machine 200 may be a rackmount server, a workstation, a desktop computer, a notebook computer, a tablet computer, a mobile phone, a palm-sized computing device, a personal digital assistant (PDA), etc. The host machine 200 includes host hardware 205, which may include multiple processors 220, 222, multiple devices 224, 226, memory 228, and other hardware components. The memory 228 may include volatile memory devices (e.g., random access memory (RAM)), non-volatile memory devices (e.g., flash memory), and/or other types of memory devices. The host hardware 205 may also be coupled to external storage 232 via a direct connection or a network. The host machine 200 may be a single machine or multiple host machines arranged in a cluster.

Each of the devices 224, 226 may be a physical device that is internal or external to the host machine 200. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 232), external I/O devices, etc.

The host machine 200 includes a hypervisor 240 (also known as a virtual machine monitor (VMM)). In one embodiment (as shown) hypervisor 240 is a component of a host operating system (OS) 210. Alternatively, the hypervisor 240 may run on top of a host OS 210, or may run directly on host hardware 205 without the use of a host OS 210.

The hypervisor 240 may manage system resources, including access to memory 228, devices 224, 226, secondary storage, and so on. Alternatively, hypervisor 240 may rely on the host OS 210 to manage the system resources. The hypervisor 240, though typically implemented in software, may emulate and export a bare machine interface (host hardware 205) to higher level software. Such higher level software may comprise a standard or real-time operating system (OS), may be a highly stripped down operating environment with limited operating system functionality, may not include traditional OS facilities, etc. The hypervisor 240 presents to other software (i.e., "guest" software) the abstraction of one or more virtual machines (VMs) 215-219, which may provide the same or different abstractions to various guest software (e.g., guest operating system, guest applications, etc.).

The host machine 200 hosts any number of virtual machines (VM) 215-219 (e.g., a single VM, one hundred VMs, etc.). A virtual machine 215-219 is a combination of guest software that uses an underlying emulation of host machine 200 (e.g., as provided by hypervisor 240). Each VM 215-219 may include one or multiple virtual components such as virtual processors, virtual memory, virtual devices (e.g., virtual storage), and so forth. Each of these virtual components may map to a hardware component, such as a processor 220, 222, device 224, 226, external storage 232, or memory 228. Virtual machines 215-219 can be, for example, hardware emulation, full virtualization, para-virtualization, and operating system-level virtualization virtual machines. The guest software that runs in a VM 215-219 may include a guest operating system, guest applications, guest device drivers, etc. The virtual machines 215-219 may have the same or different guest operating systems, such as Windows®, Linux®, Solaris®, etc.

Some virtual machines 215, 217 may include guest software that is accessible by clients (e.g., local clients and/or remote clients) to provide services to those clients. For example, VMs 215, 217 include virtual servers 270, 272 such as a virtual web server, a virtual data storage server, a virtual gaming server, a virtual enterprise application server, etc. A client may connect to a virtual sever 270, 272 to request one or more services provided by the virtual server 270, 272.

Similarly, VMs 216, 218 include a virtual desktop 274, 276. A virtual desktop 274, 276 is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 216, 218. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

VM 219 may include a virtual backup appliance 278. A virtual appliance may be a virtual machine based on a virtual disk image that includes a preconfigured operating system environment and a single application. The virtual appliance 278 may simplify the delivery, setup and operation of that single application. The virtual appliance 278 may be a subset of a virtual machine 119. The virtual backup appliance 278 is a virtual appliance that includes a guest backup application and a configuration to facilitate operation of the guest backup operation. The guest backup operation may perform backup operations on its own or may coordinate with a remote backup service to perform backup operations. Backup operations may include backing up a mounted virtual disk image (e.g., a mounted temporary snapshot) to local storage, to external storage 232, or to a remote backup service.

In one embodiment, host machine 200 includes a node manager 245 and a global manager 250. Node manager 245 may correspond to node manager 175 and global manager 250 may correspond to global manager 170 of FIG. 1. For example, global manager 250 may include a backup manager 252 that corresponds to backup manager 110 and node manager 245 may include a backup module 254 that corresponds to backup module 112. As illustrated, a single host machine may include both a node manager 245 and a global manager 250. Alternatively, a host machine may include only a node manager 245 or only a global manager 250.

Host machine 200 is shown to include both a virtual backup appliance 278 and a host backup application 242 running in the host OS 210. Alternatively, host machine 200 may include only the host backup application 242 or only the virtual backup appliance 278.

Figure 3:
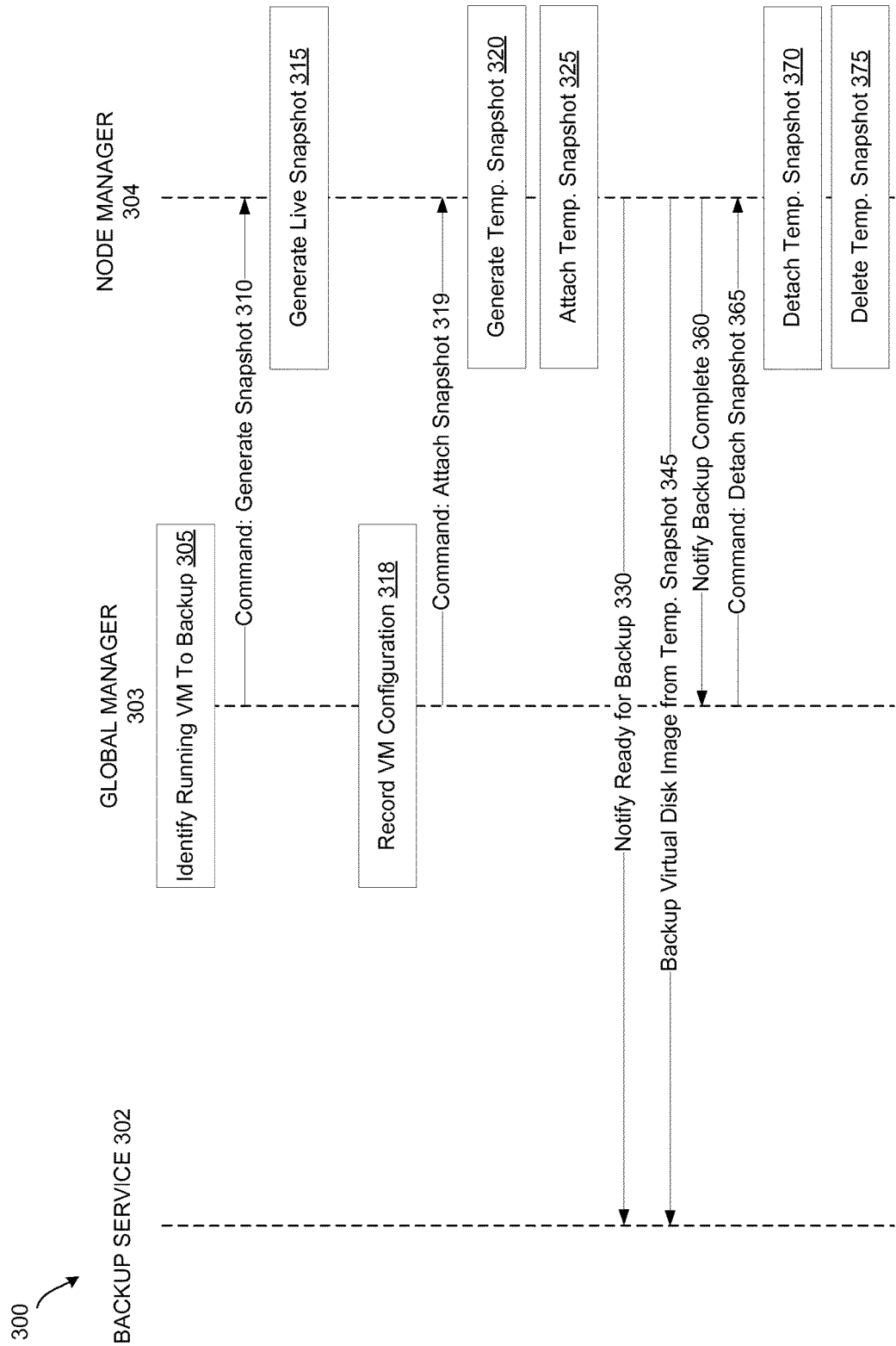
FIG. 3 is a sequence diagram illustrating one embodiment for importing a virtual disk image to a virtual machine management system.

FIG. 3 is a sequence diagram 300 illustrating one embodiment for performing a backup of a virtual disk image that is attached to a virtual machine and in use. The sequence diagram 300 includes a backup service 302, a global manager 303 and a node manager 304. Alternatively, in some embodiments the backup service 302 may not be used.

At block 305, the global manager 303 identifies an active virtual disk image and/or a running VM to which the virtual disk image is attached to backup. In one embodiment, global manager 303 receives a request from the backup service 302 identifying a virtual disk image that is to be backed up. Alternatively, global manager 303 may include an internal rule engine that may identify one or more virtual disk images to backup based on backup rules. For example, global manager 303 may include backup rules that indicate that virtual disk images attached to running virtual machines should be backed up on a periodic basis (e.g., every 10 minutes, every hour, once a day, etc.). Alternatively, global manager 303 may receive a request from a user (e.g., a system administrator) specifying a virtual disk image to be backed up.

At block 310, the global manager 303 may instruct the node manager 304 to prepare for backup of the identified virtual machine. In one embodiment, at block 310 the global manager 303 instructs the node manager 304 to generate a live snapshot of a virtual disk image attached to a VM. At block 315, the node manager 304 generates a live snapshot of the virtual disk image. Generating the snapshot may include creating a new read-write volume for the virtual disk image, flushing a cache of the VM to an active read-write volume, and converting the active read-write volume to a read-only volume. The new volume becomes the active volume, will be based on the previous volume, and will indicate differences from the previous volume.

At block 318, the global manager 303 records the VM configuration at the time of the snapshot. The global manager 303 or node manager 304 may additionally record a disk configuration of a virtual disk image associated with the virtual machine.

At block 319, the global manager 303 may instruct the node manager 304 to attach the now read-only volume to a backup component (e.g., to a virtual backup appliance or a host backup application). Responsive to the command to attached the read only volume to the backup component, at block 320 the node manager generates a temporary or transient snapshot of the previously active volume that was converted to a read-only volume. The temporary snapshot includes a temporary volume that will act as an active volume based on the destination snapshot of the virtual disk image to be backed up. The temporary snapshot will not be exposed to a user, but will be exposed at the system level and to the backup component.

At block 325, the node manager attaches the temporary snapshot to the backup component. This may include attaching the temporary volume of the temporary snapshot to the backup component. The new temporary snapshot will provide the backup appliance access to the virtual disk image's data as contained in the temporary volume and any previous volumes that precede the temporary volume. The temporary volume is a read-write volume, and can be written to by the backup component or backup service 302 without affecting or altering the data in the read-only volumes included in the attached temporary snapshot.

At block 330, the node manager 304 may notify the global manager 303 that the virtual machine is ready for backup. Global manager 303 may then notify the backup service 302 that the virtual machine is ready for backup. Alternatively, the node manager 304 may directly notify the backup service 302 that the virtual machine is ready for backup at block 330. The notification may include an address of the virtual machine running in the virtual backup appliance or backup facilitator application. The address may include, for example, an internet protocol (IP) address, a media access control (MAC) address, a port address, and so on. The notification may also include a storage pool identifier, a storage domain identifier, a virtual disk image identifier and/or a volume identifier. The notification may additionally include metadata about the virtual disk image, such as a name of the virtual disk image, an image size of the virtual disk image, and so on. Alternatively, the backup component to which the temporary snapshot was attached may backup the virtual disk image without involvement by the backup service 302.

At block 345, the backup service 302 and/or backup component backs up the instance of the virtual disk image based on the temporary snapshot. This may include backing up the recorded VM configuration and/or disk configuration that was recorded when the live snapshot was generated. As part of the backup process, the backup service 302 or backup component may perform writes to the temporary volume of the temporary snapshot. These writes do not contain any pertinent data, and any information associated with the writes can be safely deleted later.

At block 360, the node manager 304 may notify the global manager 303 that the backup is complete. Responsive to such a notification the global manager 303 may instruct the node manager 304 to detach the temporary snapshot from the backup component at block 365. The node manager 304 may then detach the temporary snapshot from the backup component at block 370. This may trigger the node manager 304 to delete the temporary snapshot at block 375.

Figure 4:
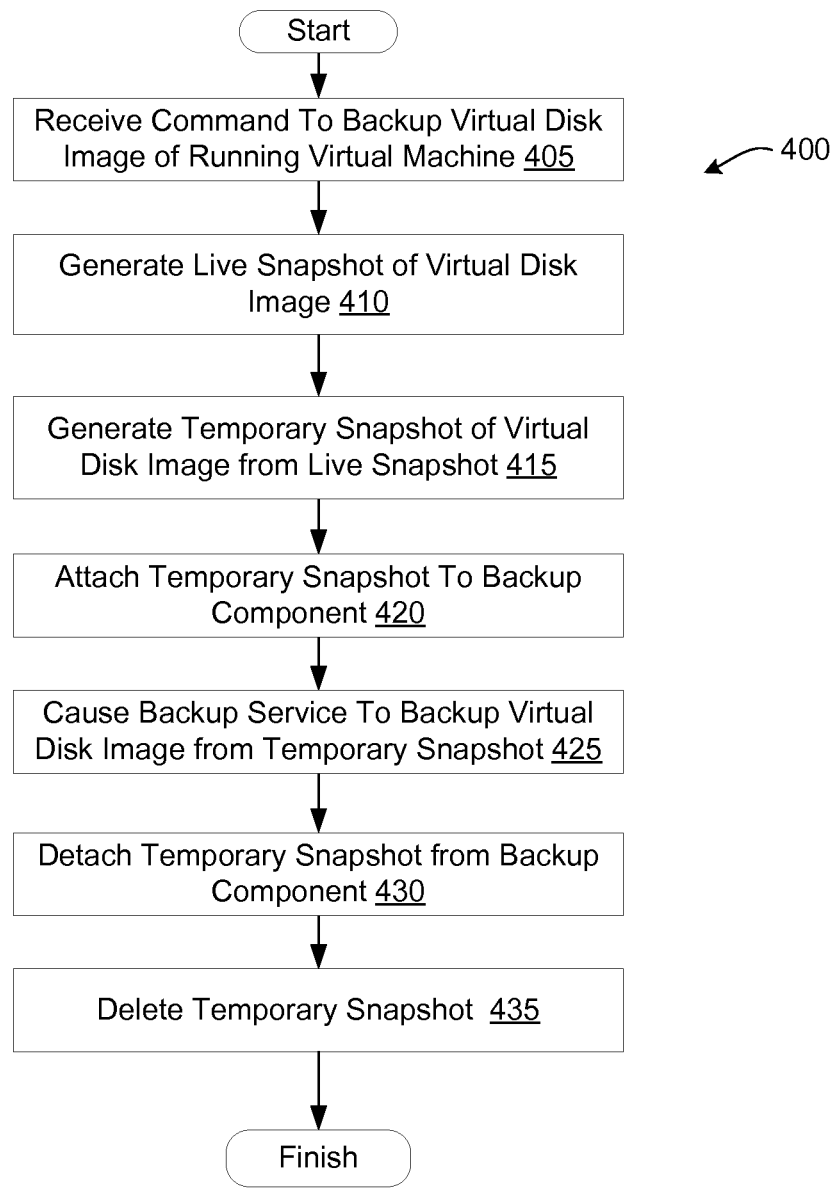
FIG. 4 is a flow diagram illustrating one embodiment for a method of backing up a live virtual machine.
Figure 5:
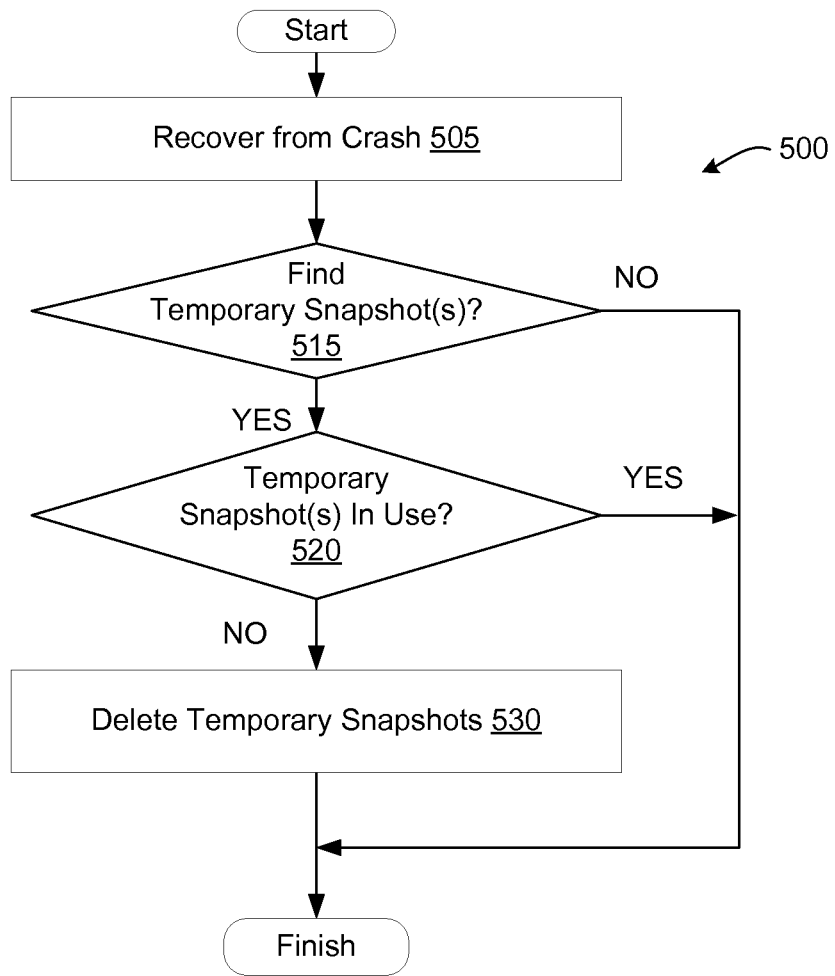
FIG. 5 is a flow diagram illustrating one embodiment for a method of recovering from a crash that occurred during backup of a virtual machine.

FIGS. 4-5 are flow diagrams of various embodiments of methods related to backing up virtual machines. The methods are performed by processing logic that may include hardware (circuitry, dedicated logic, etc.), software (such as is run on a general purpose computer system or a dedicated machine), or a combination of both. In one implementation, the methods may be performed by one or more host machines, such as host machines 103 and 105 of FIG. 1. The methods may be performed, for example, by one or both of a global manager 170 and a node manager 175 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating one embodiment for a method 400 of backing up a live virtual disk image attached to a virtual machine. At block 405 of method 400 processing logic receives a command to backup a virtual disk image attached to a running or active virtual machine. At block 410, processing logic generates a live snapshot of the virtual disk image. This includes generating the snapshot of the virtual disk image after flushing a cache of the virtual machine to disk. Additionally, processing logic may save a VM configuration and/or a disk configuration at the time of the snapshot. The snapshot plus the VM configuration and/or disk configuration information together can be used to recreate a particular state of the VM at the time that the snapshot was generated.

At block 415, processing logic generates a temporary snapshot of the virtual disk image from a read-only volume that was created by the live snapshot. In an example, assume that the virtual disk image prior to generation of the live snapshot included snapshot 1, which was a read-write volume. The live snapshot causes snapshot 1 be become a read-only volume, and causes a new snapshot (snapshot 2) that points to snapshot 1 o be created, the new snapshot being a read-write volume. The temporary snapshot that is created is then snapshot 3, which also points to snapshot 1 (and not to snapshot 2). Snapshot 3 does not include any new data (is empty), so all reads of snapshot 3 will be referred to snapshot 1.

At block 420, processing logic attaches the temporary snapshot to a backup component (e.g., a virtual backup appliance or a host backup application). If the backup component is a host backup application, then processing logic may generate a virtual block device and attach the virtual block device to the backup component. Generation of the virtual block device may include generating a map that identifies, for each offset of the virtual disk image, at which volume most recent data for the offset is located. In one embodiment, the virtual block device is a network block device (NBD). Other types of virtual block devices may also be used. The virtual block device aggregates different volumes (e.g., a particular snapshot as well as all preceding snapshots and a base volume) for the virtual disk image into a single logical volume that is readable by the host backup application. The virtual block device is then exposed to the host backup application, which in turn exposes all of the volumes of the virtual disk image to the host backup application.

At block 425, processing logic causes a backup service or the backup component to perform backup of the virtual disk image from the temporary snapshot. Since the temporary snapshot includes a temporary read-write volume that starts empty, all relevant data of the virtual disk image is contained in the read-only volume that the temporary volume of the temporary snapshot refers to. At the same time, any writes that are to be made by the backup service as part of the backup process are made to the temporary volume. In one embodiment, full backups are performed of the virtual disk image from the attached temporary snapshot. Alternatively, change block tracking may be used to record only blocks that have changed since a previous backup of the virtual disk image. Other partial backups may also be performed.

Once the backup is complete processing logic detaches the temporary snapshot from the backup component at block 430. At block 435, processing logic then deletes the temporary snapshot. The method then ends.

Backups of virtual disk images may be used to restore a state of a virtual machine and/or of a virtual disk image. Additionally, backups of virtual disk images may be used to restore individual files. For example, a backup of a virtual disk image may be used to recover one file from a backup that was mistakenly deleted or corrupted in the original virtual disk image. In in embodiment, to restore a state of a virtual machine from a backup up virtual disk image, processing logic creates a new volume, and attaches the new volume to a backup component. Processing logic then restores the backed up virtual disk image to the attached volume. The updated volume (now containing the backed up virtual disk image data) is saved, and then detached from the backup component. A VM can then be created using the saved VM configuration associated with the backed up virtual disk image. The restored virtual disk image may then be attached to the VM, at which point the virtual disk image and the state of the VM at the time of the backup are restored.

FIG. 5 is a flow diagram illustrating one embodiment for a method 500 of recovering from a crash that occurred during backup of a virtual machine. At block 505, processing logic recovers from a crash. The crash may have been a hardware crash of a host machine, a software crash of a virtual machine, of a global manager, of a node manager, of a backup component, or of another hardware or software component. Recovering from the crash may include launching new instances of one or more of the virtual machine, global manager, node manager, backup component, etc. on the same host that they previously ran on or on a new host.

After recovering from the crash, processing logic searches for any temporary snapshots that have not been deleted. In one embodiment, temporary snapshots are stored in a temporary snapshot directory. In such an embodiment, searching for temporary snapshots may include simply scanning the contents of the temporary snapshot directory. If no temporary snapshots are discovered, the method ends. If at least one temporary snapshot is found, the method continues to block 520.

At block 520, processing logic determines whether the identifies one or more temporary snapshots are in use. If all identified temporary snapshots are in use, then there are not temporary snapshots to delete, and the method ends. However, if one or more unused temporary snapshot is found, the method continues to block 530, at which processing logic deletes the one or more temporary snapshots. The method then ends.

Figure 6:
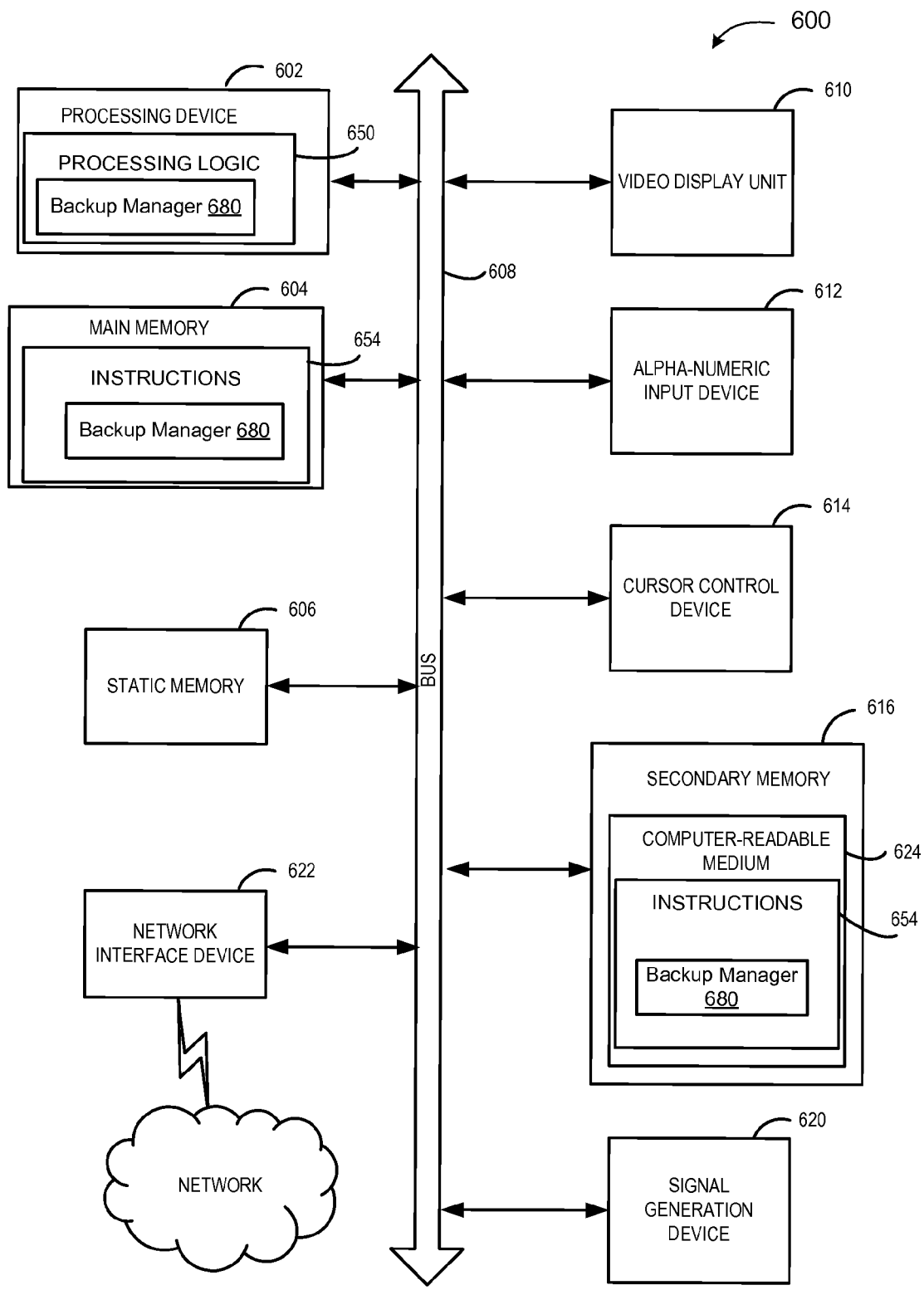
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., backup manager 680, a virtual backup appliance, a backup module, etc.). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave (e.g., any non-transitory computer-readable medium) that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1 and FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "attaching", "causing", "identifying", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   generating, by a processing device, a live snapshot of a virtual disk image attached to a virtual machine, wherein generating the live snapshot comprises:
   generating a new read-write volume for the virtual machine;

flushing data from a cache of the virtual machine to the virtual disk image;
converting an existing read-write volume of the virtual disk image to a read-only volume; and
configuring the new read-write volume as an active volume for the virtual machine, the new read-write volume to record differences from the read-only volume;
generating, by the processing device, a temporary snapshot of the read-only volume of the live snapshot, the temporary snapshot comprising a temporary read-write volume and temporary read-only volumes, wherein the temporary read-only volumes of the temporary snapshot comprise previous temporary volumes that precede the temporary read-write volume, and wherein the temporary read-write volume is based on the previous temporary volumes and indicates differences from the previous temporary volumes;
attaching the temporary snapshot to a backup component comprising a virtual appliance hosted by a virtual machine executed by the processing device, wherein the temporary snapshot is exposed at a system level of the virtual machine and to the backup component while not exposed at a user level of the virtual machine, and wherein the temporary read-write volume is written to by the backup component without altering data in the temporary read-only volumes of the temporary snapshot; and
causing at least one of the backup component or a backup service to backup the virtual disk image from the attached temporary snapshot.

2. The method of claim 1, wherein the backup component is responsible for performing or initiating backup operations associated with the backup service.

3. The method of claim 1, further comprising:
detaching the temporary snapshot of the virtual disk image from the backup component; and
subsequently deleting the temporary snapshot.

4. The method of claim 1, further comprising, responsive to recovering from a crash:
identifying the temporary snapshot;
determining whether the temporary snapshot is in use; and
responsive to determining that the temporary snapshot is not in use, deleting the temporary snapshot.

5. The method of claim 1, wherein the backup component is a host backup application, and wherein the method further comprising:
generating a virtual block device that represents the temporary snapshot of the virtual disk image; and
generating a map of the virtual disk image for the virtual block device, wherein the map identifies, for each offset in the virtual disk image, which of the temporary read-write volume or one or more previous read-only volumes contains most recent data for the offset;
wherein attaching the temporary snapshot to the backup component comprises attaching the virtual block device to the host backup application.

6. A non-transitory computer-readable storage medium having instructions that, when executed by a processing device, cause the processing device to:
generate, by the processing device, a live snapshot of a virtual disk image attached to a virtual machine, wherein generating the live snapshot comprises the processing device to:
generate a new read-write volume for the virtual machine;
flush data from a cache of the virtual machine to the virtual disk image;
convert an existing read-write volume of the virtual disk image to a read-only volume; and
configure the new read-write volume as an active volume for the virtual machine, the new read-write volume to record differences from the read-only volume;
generate, by the processing device, a temporary snapshot of the read-only volume of the live snapshot, the temporary snapshot comprising a temporary read-write volume and temporary read-only volumes, and wherein the temporary read-only volumes of the temporary snapshot comprise previous temporary volumes that precede the temporary read-write volume, and wherein the temporary read-write volume is based on the previous temporary volumes and indicates differences from the previous temporary volumes;
attach the temporary snapshot to a backup component comprising a virtual appliance hosted by a virtual machine executed by the processing device, wherein the temporary snapshot is exposed at a system level of the virtual machine and to the backup component while not exposed at a user level of the virtual machine, and wherein the temporary read-write volume is written to by the backup component without altering data in the temporary read-only volumes of the temporary snapshot; and
cause at least one of the backup component or a backup service to backup the virtual disk image from the attached temporary snapshot.

7. The non-transitory computer-readable storage medium of claim 6, wherein the backup component is responsible for performing or initiating backup operations associated with the backup service.

8. The non-transitory computer readable storage medium of claim 6, wherein the processing device is further to:
detach the temporary snapshot of the virtual disk image from the backup component; and
subsequently delete the temporary snapshot.

9. The non-transitory computer-readable storage medium of claim 6, wherein the processing device is further to, responsive to recovering from a crash:
identify the temporary snapshot;
determine whether the temporary snapshot is in use; and
responsive to determining that the temporary snapshot is not in use, delete the temporary snapshot.

10. The non-transitory computer-readable storage medium of claim 6, wherein the backup appliance is a host backup application, and wherein the processing device is further to:
generate a virtual block device that represents the temporary snapshot of the virtual disk image; and
generate a map of the virtual disk image for the virtual block device, wherein the map identifies, for each offset in the virtual disk image, which of the temporary read-write volume or one or more previous read-only volumes contains most recent data for the offset;
wherein attaching the temporary snapshot to the backup component comprises attaching the virtual block device to the host backup application.

11. A computing device comprising:
a memory; and
a processing device operatively coupled to the memory, wherein the processing device is to:

generate a live snapshot of a virtual disk image attached to a virtual machine, wherein generating the live snapshot comprises the processing device to:
  generate a new read-write volume for the virtual machine;
  flush data from a cache of the virtual machine to the virtual disk image;
  convert an existing read-write volume of the virtual disk image to a read-only volume; and
  configure the new read-write volume as an active volume for the virtual machine, the new read-write volume to record differences from the read-only volume;
generate a temporary snapshot of the read-only volume of the live snapshot, the temporary snapshot comprising a temporary read-write volume and temporary read-only volumes, and wherein the temporary read-only volumes of the temporary snapshot comprise previous temporary volumes that precede the temporary read-write volume, and wherein the temporary read-write volume is based on the previous temporary volumes and indicates differences from the previous temporary volumes;
attach the temporary snapshot to a backup component comprising a virtual appliance hosted by a virtual machine executed by the processing device, wherein the temporary snapshot is exposed at a system level of the virtual machine and to the backup component while not exposed at a user level of the virtual machine, and wherein the temporary read-write volume is written to by the backup component without altering data in the temporary read-only volumes of the temporary snapshot; and
  cause at least one of the backup component or a backup service to backup the virtual disk image from the attached temporary snapshot.

12. The computing device of claim 11, wherein the backup component is responsible for performing or initiating backup operations associated with the backup service.

13. The computing device of claim 11, wherein the processing device is further to:
  detach the temporary snapshot of the virtual disk image from the backup component; and
  subsequently delete the temporary snapshot.

14. The computing device of claim 11, wherein the processing device is further to, responsive to recovering from a crash:
  identify the temporary snapshot;
  determine whether the temporary snapshot is in use; and
  responsive to determining that the temporary snapshot is not in use, delete the temporary snapshot.

15. The computing device of claim 11, wherein the backup appliance is a host backup application, and wherein the processing device is further to:
  generate a virtual block device that represents the temporary snapshot of the virtual disk image; and
  generate a map of the virtual disk image for the virtual block device, wherein the map identifies, for each offset in the virtual disk image, which of the temporary read-write volume or one or more previous read-only volumes contains most recent data for the offset;
  wherein to attach the temporary snapshot to the backup component, the processing device is to attach the virtual block device to the host backup application.

* * * * *